(12) United States Patent
Wang et al.

(10) Patent No.: US 7,747,289 B2
(45) Date of Patent: *Jun. 29, 2010

(54) MOBILE COMMUNICATION DEVICE WITH A TRANSITION EFFECT FUNCTION

(75) Inventors: Chun-Yi Wang, Taipei (TW); Ching-Wai Fu, Taipei (TW); Chih-Liang Chiu, Taipei (TW)

(73) Assignee: ASUSTeK Computer Inc., Peitou, Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 12/482,468

(22) Filed: Jun. 11, 2009

(65) Prior Publication Data
US 2009/0253465 A1 Oct. 8, 2009

Related U.S. Application Data

(63) Continuation of application No. 10/906,400, filed on Feb. 18, 2005, now Pat. No. 7,561,874.

(30) Foreign Application Priority Data
Jan. 18, 2005 (TW) .............................. 94101461 A

(51) Int. Cl.
*H04M 1/00* (2006.01)
(52) U.S. Cl. .................... 455/566; 455/550; 455/550.1; 455/418
(58) Field of Classification Search ................. 455/566, 455/550.1, 575
See application file for complete search history.

(56) References Cited

U.S. PATENT DOCUMENTS

| 5,353,391 | A | * | 10/1994 | Cohen et al. ................. 345/619 |
| 5,359,712 | A | | 10/1994 | Cohen et al. |
| 5,870,683 | A | | 2/1999 | Wells |
| 5,914,717 | A | | 6/1999 | Kleewein et al. |
| 6,049,336 | A | | 4/2000 | Liu et al. |
| 6,351,599 | B1 | | 2/2002 | Komeno |
| 6,795,211 | B1 | | 9/2004 | Eschbach |
| 2001/0024205 | A1 | | 9/2001 | Kishi et al. |

(Continued)

FOREIGN PATENT DOCUMENTS

CN  1351326 A  5/2002

(Continued)

OTHER PUBLICATIONS

XP-002336392, Jun. 23, 2004.

(Continued)

*Primary Examiner*—Charles N Appiah
*Assistant Examiner*—Michael T Vu
(74) *Attorney, Agent, or Firm*—Winston Hsu

(57) ABSTRACT

A mobile communication device includes a memory for storing a first frame image corresponding to a first menu and a second frame image corresponding to a second menu, a display unit coupled to the memory for displaying frame images, and a control unit coupled to the display unit for controlling the display unit to display, in sequence, the first frame image, at least one corresponding transitive image generated according to the first frame image or the second frame image, and finally, the second frame image when the control unit receives a command for transferring the first menu to the second menu.

10 Claims, 7 Drawing Sheets

U.S. PATENT DOCUMENTS

| | | |
|---|---|---|
| 2004/0102224 A1 | 5/2004 | Lee |
| 2004/0204144 A1* | 10/2004 | Lim ........................... 455/566 |
| 2004/0246244 A1 | 12/2004 | Nose |
| 2005/0043057 A1 | 2/2005 | Lo |
| 2005/0043064 A1 | 2/2005 | Lo |
| 2005/0119031 A1 | 6/2005 | Spalink |
| 2005/0157792 A1 | 7/2005 | Baba |

FOREIGN PATENT DOCUMENTS

| | | |
|---|---|---|
| CN | 1505428 A | 6/2004 |
| JP | 2003 219011 A | 7/2003 |

OTHER PUBLICATIONS

XP-002336393, Jun. 24, 2002.

* cited by examiner

MOBILE COMMUNICATION DEVICE WITH A TRANSITION EFFECT FUNCTION

CROSS REFERENCE TO RELATED APPLICATIONS

This is a continuation application of Ser. No. 10/906,400, now pending, filed on Feb. 18, 2005.

BACKGROUND OF THE INVENTION

1. Field of the Invention

The present invention relates to a mobile communication device with a transition effect function, more particularly, to a mobile communication device with a transition effect function when transferring from a first menu to a second menu.

2. Description of the Prior Art

As modern society's information infrastructure progresses, electronic devices are commonly utilized in every area; for example, convenient and light mobile phone devices are widely utilized and have become a very common part of our daily lives when communicating with others. The mobile phone device allows us to exchange information by making a convenient phone call. The mobile phone has developed very rapidly for the past several years. New mobile phones are equipped with more refined functions. Increased usage of the mobile phone has caused an increase in production. The newly produced mobile phones offer a variety of new designs with the trend moving towards smaller sized phones. Therefore, a mobile phone program design of how to update a new visual effect becomes an important issue.

When a user interface of the current mobile phone switches application programs, function menus, and photo previews, there is no special effect accompanying the changing of screens; simply switching from a previous screen to a next screen. For example, please refer to FIG. 1. FIG. 1 illustrates a diagram of transferring a first function menu to a second function menu according to the prior art. When a user is operating a keypad of the mobile phone and changes the display screen from the first function menu to the second function menu, the user sees the screen image change directly and immediately from the first function menu to the second function menu. There is no transition effect during the changing of screens. The transfer of screens simply changes directly and immediately from one screen to another in the modern technology mobile phones. This lacks a variety of visual effect for the user.

SUMMARY OF THE INVENTION

The claimed invention relates to a mobile communication device with a transition effect to solve the above-mentioned problem.

The mobile communication device of the claimed invention comprises a memory for storing a first frame image corresponding to a first menu and a second frame image corresponding to a second menu, a display unit coupled to the memory for displaying the frame image, and a control unit coupled to the display unit for controlling the display unit to display, in sequence, the first frame image, then at least one corresponding transitive image generated according to the first frame image or the second frame image, and finally the second frame image when the control unit receives a command for transferring the first menu to the second menu.

A method of controlling a mobile communication device to transfer a first menu to a second menu, the method comprising receiving a menu switching command, and a display unit of the mobile communication device displaying, in sequence, a corresponding first frame image of the first menu, then at least one transitive image generated according to the first frame image or the corresponding second frame image, and finally, the second frame image.

Based on design, the system can meet the requirements of commercial telecommunication carriers or personal users. The system can easily utilize transition effect algorithms and transition timing to display a variety of effects to the user interface.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
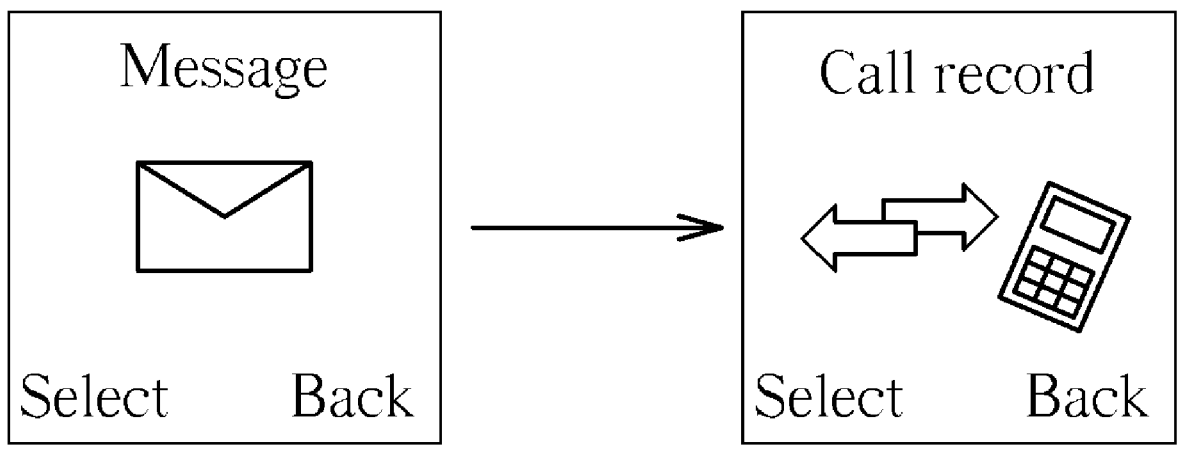
FIG. 1 illustrates a diagram of transferring a first function menu to a second function menu according to the prior art.
Figure 2:
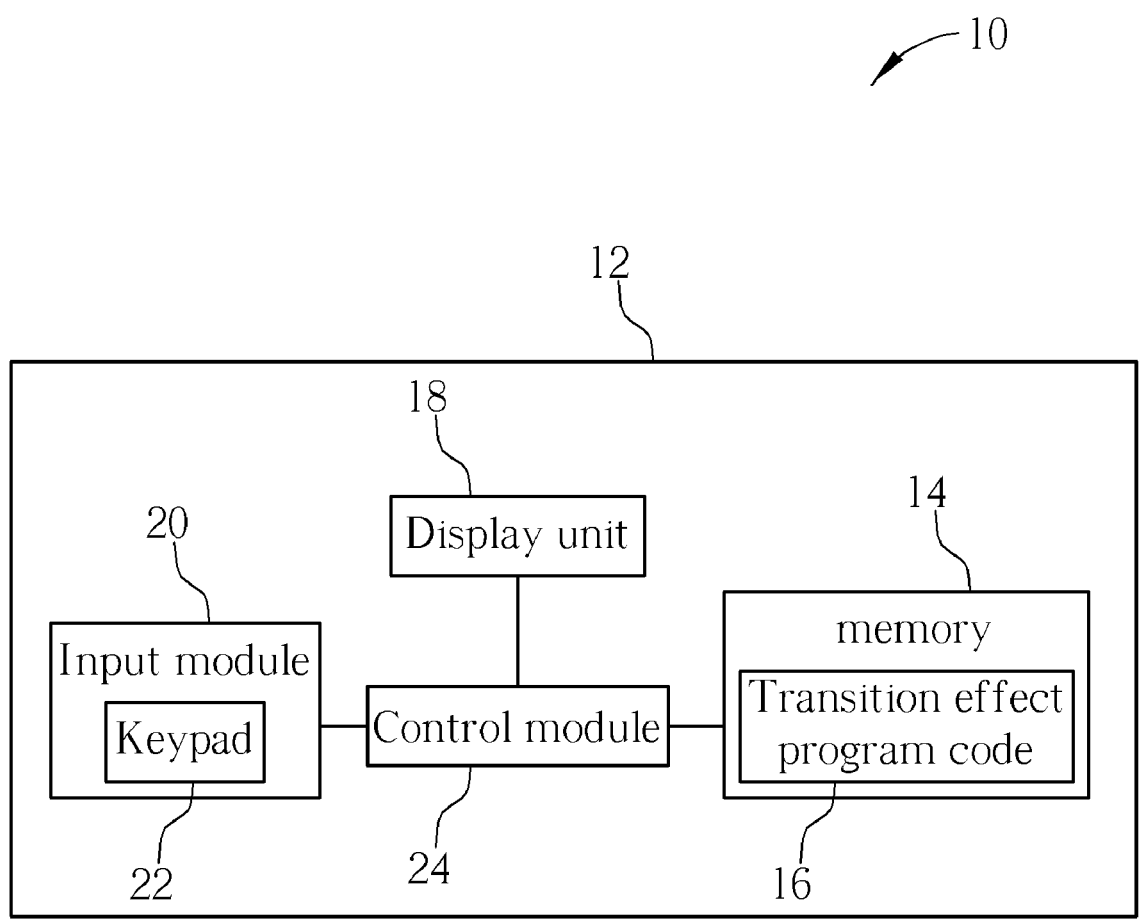
FIG. 2 illustrates a functional block diagram of a mobile communication device according to the present invention.

Please refer to FIG. 2. FIG. 2 illustrates a functional block diagram of a mobile communication device 10 according to the present invention. The mobile communication device 10 can be a mobile phone. The mobile communication device 10 comprises a casing 12 for cladding internal components of the mobile communication device 10; a memory 14, installed within the casing 12, for storing a first frame image corresponding to a first menu, a second frame image corresponding to a second menu and a transition effect program code 16; a display unit 18, installed within the casing 12 for displaying a frame image, the display unit can be a liquid crystal display (LCD); and an input module 20 comprises a plurality of keypads 22 for inputting a command to transfer the first menu to the second menu. For example, the keypad 22 can be a direction key for transferring to the previous function menu or the next function menu. The mobile communication device 10 further comprises a control unit 24, installed within the casing 12 and coupled to the memory 14, the display unit 18 and the input module 20, for controlling the display unit 18 to display, in sequence, the first frame image, then at least one corresponding transitive image generated according to the first frame image or the second frame image, and finally the second frame image when the control unit 24 receives a command for transferring the first menu to the second menu.

Figure 3:
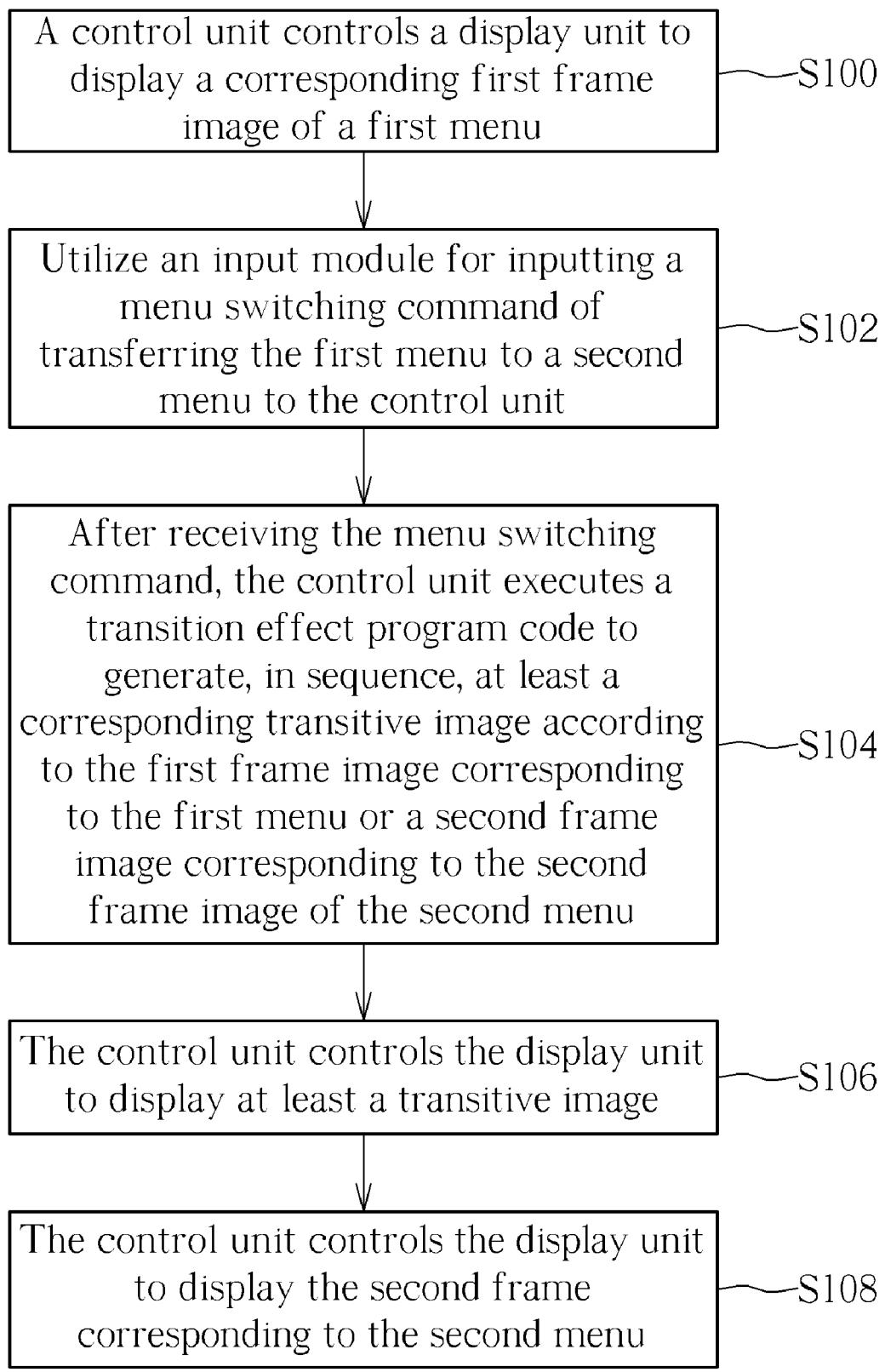
FIG. 3 illustrates a flowchart of a mobile communication device for transferring a first menu to a second menu according to the present invention.

Please refer to FIG. 3. FIG. 3 illustrates a flowchart of a mobile communication device 10 for transferring the first menu to the second menu according to the present invention. The steps are as follows:

Step S100: The control unit 24 controls the display unit 18 to display a corresponding first frame image of the first menu.

Step S102: Utilizing the input module 20 for inputting a menu switching command of transferring the first menu to the second menu to the control unit 24.

Step S104: After receiving the menu switching command, the control unit 24 executes the transition effect program code 16 to generate, in sequence, at least a corresponding transitive image according to the first frame image corresponding to the first menu or the second frame image corresponding to the second frame image of the second menu.

Step S106: The control unit 24 controls the display unit 18 to display at least a transitive image.

Step S108: The control unit 24 controls the display unit 18 to display the second frame corresponding to the second menu.

Figure 4:
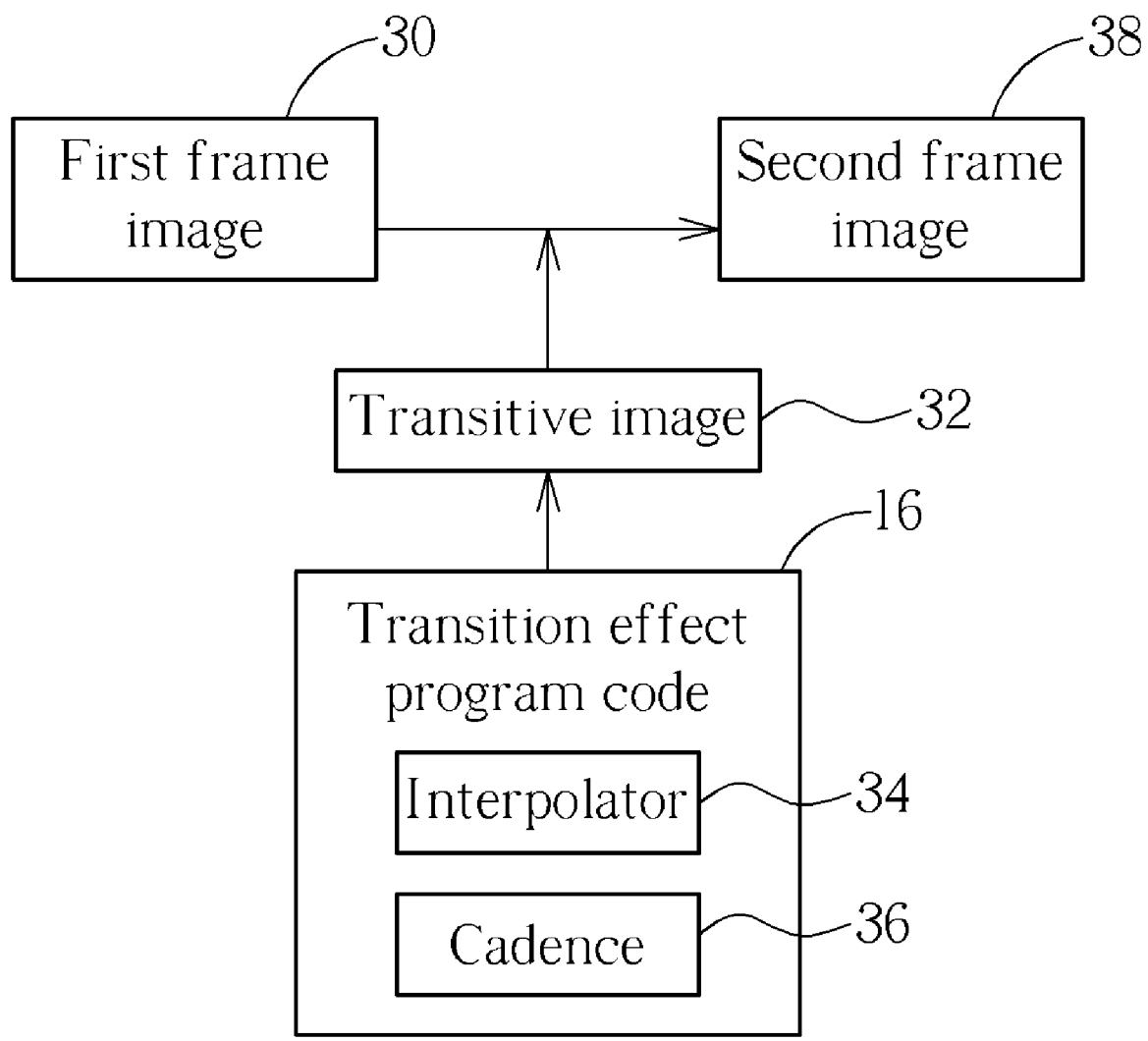
FIG. 4 is an architecture graph of a corresponding transitive image generated according to a first frame image or a second frame image.

The above-mentioned steps will be explained in detail. The display unit 18 of the mobile communication device 10 displays a corresponding first frame image of the first menu. When the user operates the keypad 22 of the input module 20 and transfers the first menu to the second menu, the input module 20 inputs to the control unit 24 a menu switching command for transferring the first menu to the second menu, after receiving the menu switching command, the control unit 24 executes the transition effect program code 16 to generate, in sequence, at least a corresponding transitive image according to the first frame image corresponding to the first menu or the second frame image corresponding to the second menu. Please refer to FIG. 4. FIG. 4 is an architecture graph of a corresponding transitive image 32 generated according a first frame image 30 or a second frame image 38. The transition effect program code 16 comprises an interpolator 34 and a cadence 36. The transition effect program code 16 determines the number of transition frames during the transfer of the first frame image of the first menu to the second frame image of the second menu, then the interpolator 34 calculates the frame image of the transitive image 32 according to the first frame image 30 or the second frame image 38 or the combination of the first frame image 30 and the second frame image 38. As part of the transition effect algorithm, different types of effects can be stored as different functions; the transition effect algorithm consists of a fade out/fade in screen, a fade in screen, a fade out screen, a cross fade screen and a blind screen.

Figure 5:
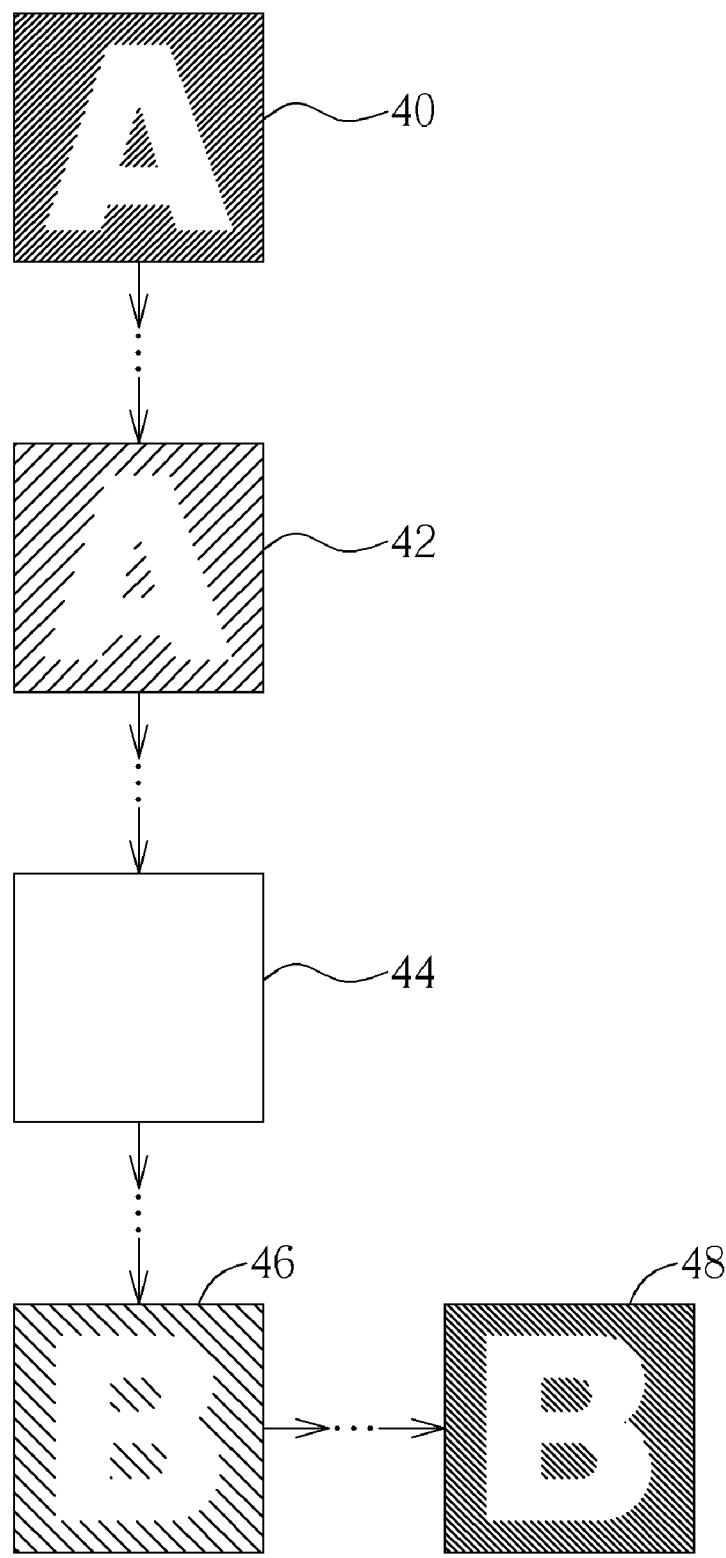
FIG. 5 illustrates a diagram of a transition frame displayed by a display unit during the transition effect of a fade out/fade in screen.

For example, the transition effect display of the fade out/fade in screen can be utilized according to frame image data generated by the first frame image 30 and according to second frame image data generated by the second frame image 38. Please refer to FIG. 5. FIG. 5 illustrates a diagram of a transition frame displayed by the display unit 18 during the transition effect of the fade out/fade in screen. According to FIG. 4, the frame image 30 displays a graph A 40 of a highest tone and the second frame image 38 displays a graph B 48 of the highest tone. After the control unit 24 executes the transition effect of the fade out/fade in screen of the transition effect program code 16, the graph A 42 of a lighter tone will be generated according to the first frame image 40 and will be displayed on the display unit 18 to enable the fade out effect until the first frame 40 fades out completely to generate a white screen 44. The graph B 46 of a lighter tone will be generated according the second frame image 48 and will be displayed on the display unit 18 to enable the fade in effect until the second frame fades in completely. The theory of image processing of the transition effect of a simple fade in and fade out screen will not be further mentioned.

Figure 6:
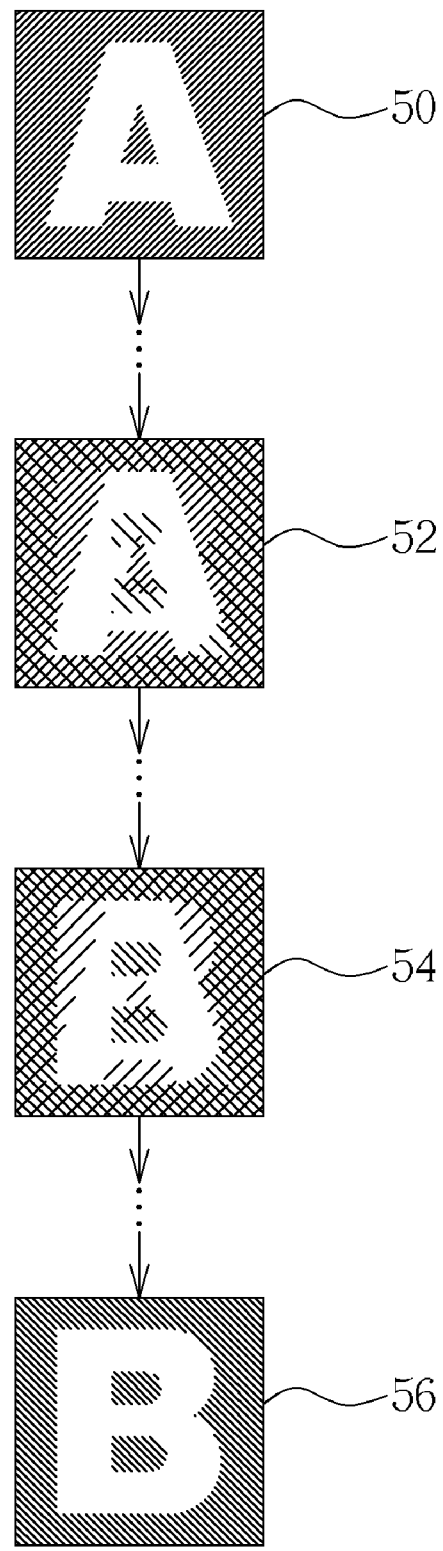
FIG. 6 illustrates a diagram of a transition frame displayed by a display unit during the transition effect of a cross fade screen.

To utilize and display a transition effect of a cross fade screen, a transition frame is formed according to a frame image generated by the first frame image 30 and the second frame image 38 of FIG. 4. Please refer to FIG. 6. FIG. 6 illustrates a diagram of a transition frame displayed by the display unit 18 during the transition effect of the cross fade screen. As shown in FIG. 6, the first frame image 30 displays a graph A 50 of a highest tone and the second frame image 38 displays a graph B 56 of the highest tone. After the control unit 24 executes the transition effect of the cross fade screen of the transition effect program code 16, a graph 52 and a graph 54 will be formed by combination of the first frame image 50 and the second frame image 56 to generate an increasingly lighter tone graph A 52 and an increasingly darker tone graph B 54 and will be displayed on the display unit 18 to enable an effect of graph A 52 fading out and an effect of graph B 54 fading in simultaneously, until the first frame image 50 fades out completely and the second frame image 56 fades in completely. The method of the transition effect of the cross fade screen is generated according to the first frame image 50 and the second frame image 56, the first frame image 50 and the second frame image 56 can be combined according to different proportions of gray level resolution. In the effect of the first frame image 50 fading out and the second frame image 56 fading in simultaneously, the estimated proportion of the decreasing gray level resolution of the first frame image 50 and the estimated proportion of the increasing gray level resolution of the second frame image 56 are allocated according to the number of transition frames. For example, if the number of transition frames is set to nine frames, then the estimated proportion of the gray level resolution of the first frame 50 will be set at a 100% and there will be a 10% decrease at each interval until 0%. As there are nine transition frames, the proportions from the first transition frame are: 90%, 80%, 70%, 60%, 50%, 40%, 30%, 20%, and 10%. The estimated proportion of the gray level resolution of the second frame 56 will be set at a 0% and there will be a 10% increase at each interval until 100%. As there are nine transition frames, the proportions from the first transition frame are: 10%, 20%, 30%, 40%, 50%, 60%, 70%, 80%, and 90%.

Figure 7:
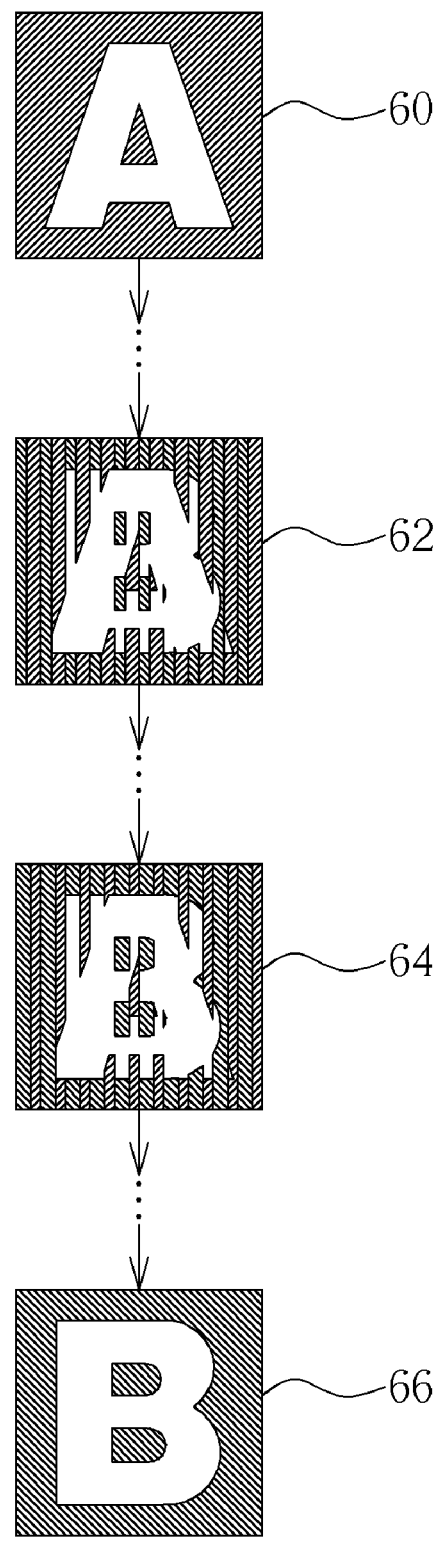
FIG. 7 illustrates a diagram of a transition frame displayed by a display unit during the transition effect of a blind screen.

To utilize and display a transition effect of a blind screen, a transitive frame is formed according to a frame image generated by the first frame image 30 and the second frame image 38 of FIG. 4. Please refer to FIG. 7. FIG. 7 illustrates a diagram of a transition frame displayed by the display unit 18 during the transition effect of the blind screen. As shown in FIG. 7, the first frame image 30 displays a graph A 60 of a highest tone and the second frame image 38 displays a graph B 66 of the highest tone. After the control unit 24 executes the transition effect of the blind screen of the transition effect program code 16, an overlapping of transition graph 62 and a graph 64 will be formed according to the first frame image 60 and the second frame image 66 and will be displayed on the display unit 18 to enable the effect of the blind screen as a part of the first frame image 60 diminishing and a part of the second frame image 66 appearing simultaneously, until the first frame image 60 diminishes completely and the second frame image 66 appears completely The method of the transition effect of the blind screen is generated according to the first frame image 60 and the second frame image 66, the graph data of the graph A and the graph B are inserted into the different locations of the transition frames, during the transition effect, the proportion of the graph A will decrease slowly and the proportion of the graph B will increase slowly, finally the frame image 60 will diminish completely and the second frame image 66 will appear completely.

In the above-mentioned, after receiving the menu switching command, the control unit 24 executes the transition effect program code 16 to perform a transition effect and generate a corresponding transitive image. The decision of the interpolator can either be a method of an internal system default, a random selection, or a user setting. The transition image can be a frame image (e.g., fade out effect) generated according to the first frame image, a frame image (e.g., fade in effect) generated according to the second frame image, and a frame image (e.g., fade out/fade in, blind effect) generated according to the first and second frame. Additionally, inserted among the transition images can be a frame image generated according to the first frame image (fade out effect), a frame image generated according to the second frame image(fade in effect), a frame image generated according to the first and second frame (fade out/fade in, blind effect), therefore different arrangements can present the desired transition visual effects.

In deciding the transition timing, the cadence object of the transition effect program code 16 determines the timing of the transition images to control the cadence of the transition, which means that when the cadence object is triggered, the interpolator object of the transition effect program code 16 will calculate a new transitive image for transmitting to the display unit 18. The method of triggering the cadence object can either be a timer trigger, keypad trigger, or other kind of trigger mechanism. For the timer trigger method, the mobile communication device 10 further comprises a timer for the control unit 24 to control the display unit 18 to display the time interval of the first frame image and the transition frame image or the time interval of the transitive image and the second frame image. After receiving a command for transferring the first menu to the second menu, the control unit 24 controls the display unit to display the first frame image, the transition frame image, and the second frame image according to the time intervals provided by the timer. For example, if the setting in the timer is set to 0.1 seconds to trigger then the cadence object calculates a new transition image every 0.1 seconds, then in every 0.1 seconds the new transition image will be displayed on the display unit 18 to present a corresponding transition effect. Furthermore, the keypad trigger method utilizes the keypad 22 of the input module 20 to input an activating command to the control unit 24 to trigger the cadence object, such as setting the keypad 22 to trigger the cadence object every time the keypad 22 is pressed for the cadence object to continuously calculate new transition images. After receiving the activating command from the input module 20, the control unit 24 can control the display unit 18 to display the transition image calculated by the cadence object. Hence after each keypad 22 is pressed to trigger the cadence object, the user can view the new transition image on the display unit 18. Therefore the decision of the cadence can either be a method of an internal system default, a random selection, or a user setting.

In comparison to the prior art, the mobile communication device with a transition effect function is capable of switching application programs, function menus, and photo previews; effects are added during the changing of screens to enhance and make more interactive the user interface. This increases the value of the mobile communication device by providing a variety of visual effects when the user is operating the mobile communication device.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A mobile communication device comprising:
   a casing;
   a memory installed within the casing for storing a first frame image of a first function menu and a second frame image of a second function menu;
   a display unit installed within the casing coupled to the memory for displaying a frame image;
   a control unit installed within the casing coupled to the display unit for controlling the display unit to display, in sequence, the first frame image, then a frame image of at least one transitive image, and finally the second frame image when the control unit receives a command for transferring the first function menu to the second function menu; and
   an interpolator within the casing coupled to the control unit for interpolating a visually altered version of the first frame image, a visually altered version of a second frame image, or a mixture of both as the frame image of the at least one transitive image.

2. The mobile communication device of claim 1 wherein the memory further stores a transition effect program code, and the control unit executes the transition effect program code to generate at least one corresponding transitive image when the control unit receives a command for transferring the first menu to the second menu.

3. The mobile communication device of claim 1 further comprising: an input module for inputting a command for transferring the first function menu to the second function menu.

4. The mobile communication device of claim 3 wherein the input module is capable of inputting an activating command to the control unit, and the control unit is capable of controlling the display unit to display the at least one transitive image after receiving the activating command from the input module.

5. The mobile communication device of claim 3 wherein the input module comprises a plurality of keypads.

6. The mobile communication device of claim 1 wherein the mobile communication device is a mobile phone.

7. The mobile communication device of claim 1 wherein the control unit controls the display unit to display a new transition image after each keypad press.

8. A mobile communication device comprising:
   a casing;
   a memory installed within the casing for storing a first frame image of a first function menu and a second frame image of a second function menu;
   a display unit installed within the casing coupled to the memory for displaying a frame image;
   a control unit installed within the casing coupled to the display unit for controlling the display unit to display, in sequence, the first frame image, then a frame image of at least one transitive image, and finally the second frame image when the control unit receives a command for transferring the first function menu to the second function menu; and
   an interpolator within the casing coupled to the control unit for interpolating a mixture of the first frame image and the second frame image to generate the frame image of the at least one transitive image.

9. The mobile communication device of claim 8 wherein the control unit controls the display unit to display a plurality of new transition images according to a user adjustable cadence.

10. The mobile communication device of claim 8 wherein the control unit controls the display unit to display a new transition image after each keypad press.

* * * * *